Nov. 17, 1959  E. W. JOHNSON  2,913,605
EDDY CURRENT BRAKE
Filed May 23, 1955  3 Sheets-Sheet 1

INVENTOR.
ERNEST W. JOHNSON
BY
*James and Franklin*
ATTORNEYS

Nov. 17, 1959   E. W. JOHNSON   2,913,605
EDDY CURRENT BRAKE
Filed May 23, 1955   3 Sheets-Sheet 2

INVENTOR.
ERNEST W. JOHNSON
BY
ATTORNEYS

Nov. 17, 1959     E. W. JOHNSON     2,913,605
EDDY CURRENT BRAKE

Filed May 23, 1955     3 Sheets-Sheet 3

INVENTOR.
ERNEST W. JOHNSON
BY
ATTORNEYS

United States Patent Office 2,913,605
Patented Nov. 17, 1959

2,913,605

EDDY CURRENT BRAKE

Ernest W. Johnson, Randolph, Mass., assignor to National Pneumatic Co., Inc., Boston, Mass., a corporation of Delaware Application May 23, 1955, Serial No. 510,153

10 Claims. (Cl. 310—93)

The present invention relates to an eddy current brake particularly adapted for use in a door opening and closing system of the type disclosed for example, in the application of Vernon Durbin and Ernest W. Johnson, Ser. No. 452,292 of August 26, 1954 entitled, "Electromagnetic Door Check," and assigned to the assignee of the instant application.

The invention relates particularly to a device in which an element including conductive parts is adapted to be rotated in a magnetic field, the eddy currents induced in those conductive parts reacting with the field in order to restrain rotation, and in which the magnitude of the magnetic field within which the rotor rotates may readily be varied in order to control the braking effect independently of the speed of rotation of the rotor. As disclosed in the aforementioned pending application, such a mode of operation is particularly desirable for use in a door operating system for checking the movement of the door to a progressively greater extent as it approaches a given terminal position, the intensity of the magnetic field within which the rotor rotates therefore being progressively increased as the door nears that position. It will be appreciated, however, that the structure of the present invention has applicability in other systems and for other purposes, and that the variation in the intensity of the magnetic field can be manually adjustable or made automatically responsive to any desired external condition.

According to the instant invention a unitary structure is produced in which is housed the rotor, the magnetizable stator within which the rotor rotates, and means, here shown in the form of a permanent magnet, for providing the electromagnetic field within which the rotor rotates. The arrangement is such that, through actuation in any appropriate manner of an externally accessible element, the magnitude of the electromagnetic field active on the rotor may be varied. In the forms here specifically disclosed this adjustment is attained by moving the permanent magnet relative to the stator between an operative position in which the permanent magnet poles are in operative registration with the pole pieces of the stator and an inoperative position in which those poles are out of such registration, the magnitude of the magnetic field active on the rotor being a maximum when the magnet is in its operative position and a minimum when the magnet is in its inoperative position. It is preferred that when the magnet is in its inoperative position the pole pieces of the stator be in registration with portions of two of the magnet poles having opposite polarity, those pole piece portions thus acting as "keepers" maintaining the strength of the permanent magnet.

To the accomplishment of the above, and to such other objects as may hereinafter appear, the present invention relates to the construction of an eddy current brake as defined in the appended claims and as described in this specification, taken together with the accompanying drawings, in which:

Figure 1:
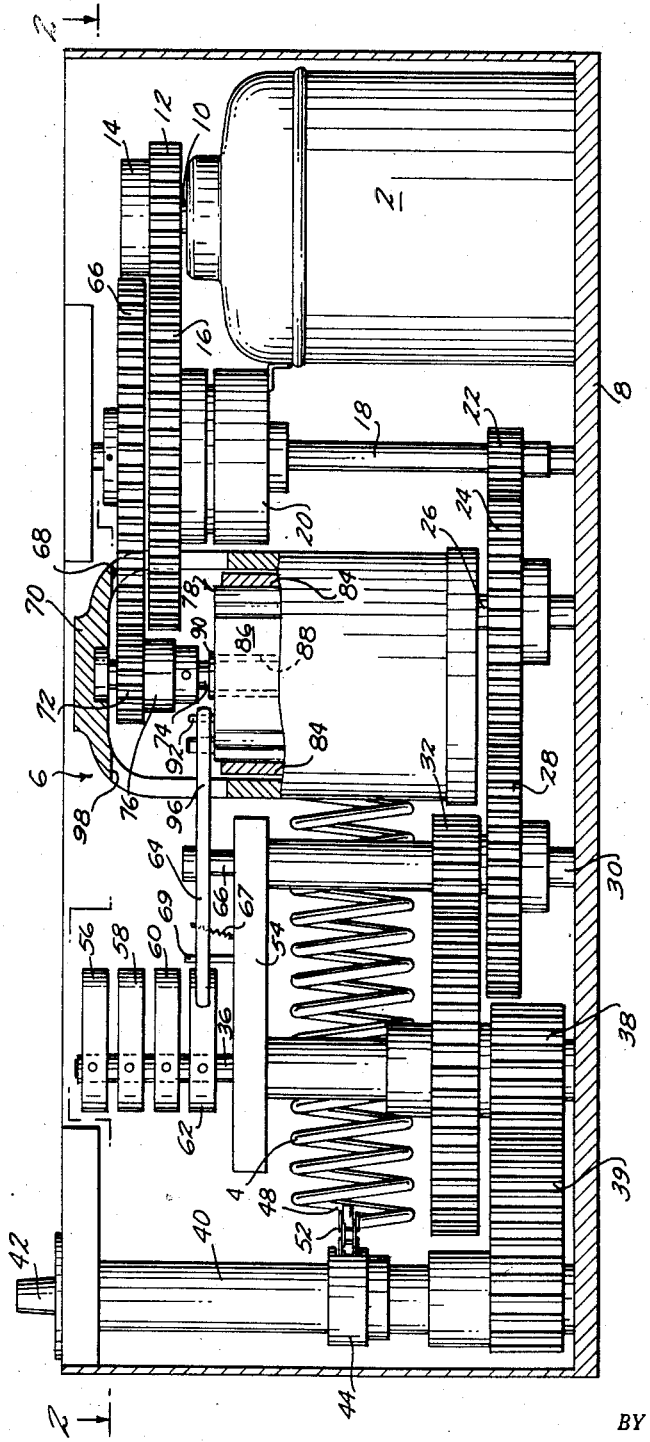
Fig. 1 is a side elevational view of a door operating unit incorporating one embodiment of the eddy current brake of the present invention, the casing of that unit being cross sectioned to show the contents thereof and a portion of the eddy current brake being broken away.
Figure 2:
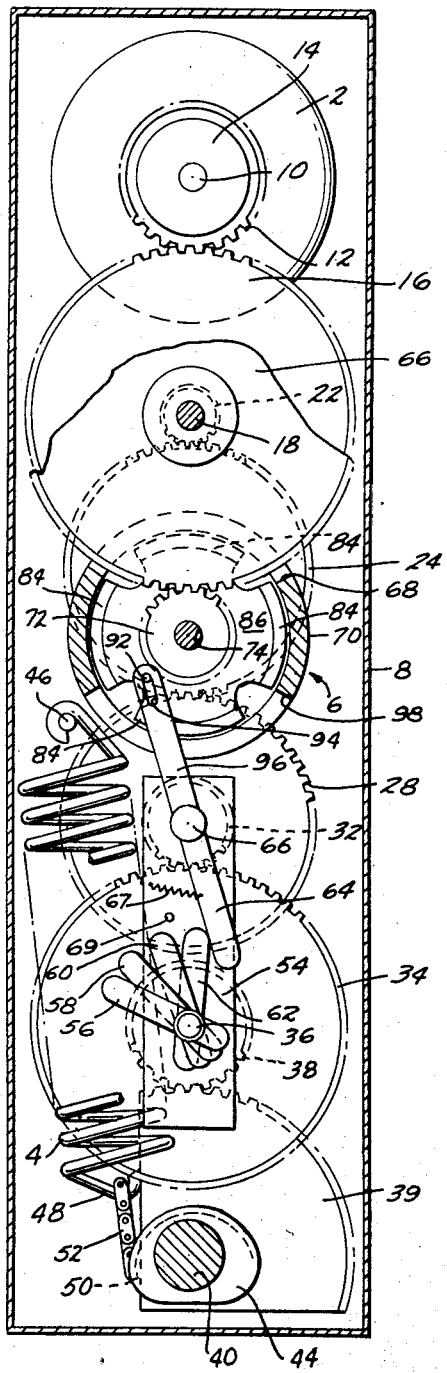
Fig. 2 is a top plan view of the unit of Fig. 1.

The door operating unit specifically disclosed in Figs. 1 and 2, and in which the eddy current brake of the present invention is incorporated, is designed to drive a door to open position by means of the motor 2 and to cause it to return to closed position through the action of the spring 4. During opening of the door the eddy current brake, generally designated 6, is inoperative, cushioning of movement of the door being accomplished electrically in conventional manner. However when the door is closing as urged by the spring 4 the eddy current brake 6 becomes operative and, at a predetermined point in the movement of the door from open to closed position, gives rise to an electromagnetic interaction which slows down the movement of the door. That interaction is dependent upon two factors, the speed at which the door is moving and the degree to which the door approaches its closed position. The greater the rapidity of movement of the door for any given position, the greater is the electromagnetic restraining interaction. The closer the door approaches to its closed position, for a given speed of movement of the door, the greater is the electromagnetic restraining interaction. The former factor is common to all eddy current brakes. The latter factor is characteristic of the instant devices and those disclosed in the aforementioned application.

The door operating unit is mounted within a casing 8 which is adapted to be received within a recess in the floor or a wall. The output shaft 10 of the motor 2 drives a gear 12 through a one-way clutch 14, the clutch being operative to connect the motor shaft 10 and gear 12 for simultaneous rotation in a direction corresponding to door opening movement. If the gear 12 be rotated in the opposite direction, as when the door is closing, the motor shaft 10 will not be rotated thereby. The gear 12 meshes with gear 16 mounted on shaft 18 and operatively connected thereto by means of an electromagnetic clutch 20. A pinion 22 rotates with the shaft 18 and meshes with gear 24 mounted on pin 26 and in turn meshing with gear 28 mounted on pin 30. Pinion 32 rotates with gear 28 and meshes with gear 34 mounted on shaft 36, pinion 38 rotating with gear 34 and meshing with sectoral gear 39 fast on output shaft 40. The tip 42 of the output shaft extends above the casing 8 and is adapted to be connected to the door to be operated in any conventional manner. It is preferred that the unit be mounted so that the output shaft 40 is in line with the axis of rotation of the door, the tip 42 of the output shaft being directly connected to the door so as to move it between open and closed positions, although this is not essential.

A cam 44 is fast on the output shaft 40. The spring 4 has one end anchored to the casing 8 at 46, the other end 48 of the spring being secured to an end of the cam 44, at 50, by means of a flexible chain 52. The spring is of the tension type, and will be extended through rotation of the cam 44 whenever the door is opened, the motor 2 driving through the gear train previously described in order to rotate the output shaft 40 to cause the door to open, that rotation being in a counter-clockwise direction as viewed in Fig. 2. Upon de-energization of the motor 2 the spring 4 will contract and thus will cause the shaft 40 to rotate until the cam 44 assumes its position shown in Fig. 2. During this closing movement of the door the gear train previously described will be rotated, but the rotor of the motor 2 will not be rotated due to the action of the one-way clutch 14.

Mounted on that portion of the shaft 36 which projects upwardly above the mounting plate 54 are a plurality of cams 56, 58, 60 and 62. The first three of these cams are utilized to control appropriate electrical circuits during the operation of the motor 2 to move the door to open position in order to control the speed of movement of the door, provide for cushioning at the end of the movement, and de-energize the motor 2 when the door is to close. The bottom cam 62, however, plays a part in the functioning of the eddy current brake 6, and to that end is operatively associated with a lever 64 pivotally mounted on pin 66 extending up from the mounting plate 54 and biased into operative engagement with the cam 62 as by the spring 67, so that as the cam 62 rotates, at least over a portion of the rotational travel of the shaft 36, the lever 64 will also be rotated. A positive stop 69 is provided to limit the spring-urged movement of the lever 64.

Mounted on the shaft 18 for rotation therewith above the gear 16 is a gear 66. The gear 66 extends through an aperture 68 in the casing 70 of the eddy current brake 6 and there meshes with gear 72, which is in turn operatively connected to shaft 74 journaled within the brake casing 70, the operative connection being by means of a one-way clutch 76, that clutch being so designed that when the shaft 18 and the gear 72 are rotated in a direction corresponding to door opening movement the shaft 74 is not rotated, but when the gear 72 and shaft 18 are rotated in a direction corresponding to door closing movement, the shaft 74 is correspondingly rotated.

Mounted in the casing 70 of the brake 6 adjacent to the bottom thereof are a plurality of pole pieces 78 formed of magnetizable material, those pole pieces being separated from one another circumferentially and having pole faces 80 between which the rotor 82 is rotatable, that rotor being fast on the shaft 74 and comprising electrically conductive material. The rotor 82 may take the form of a ring of copper or aluminum, as shown, or it may be of squirrel-type shape formed largely of magnetizable material but having conductors extending axially therethrough adjacent the circumference thereof (see Fig. 4). Portions 84 of the pole pieces 78 extend upwardly, and within those upwardly extending pole piece portions 84 an annular permanent magnet 86 is rotatably mounted, the shaft 74 extending freely through the central axial passage 88 of the magnet 86. The shaft 74 may be provided with a collar 90 which extends over the upper surface of the magnet 86 so as to hold the latter in position. A pin 92 extends up from the magnet 86 and is received within elongated slot 94 in the end 96 of the lever 64, the lever end 96 extending into the interior of the brake casing 70 through aperture 98 formed therein.

The magnet 86 is provided with magnetic poles preferably equal in number to the pole pieces 78. When the magnet 86 is rotated to its inoperative position, as it will be under the action of the lever 64 when the latter is permitted to move as urged by the spring 67 or other biasing member operative thereupon, the poles of the permanent magnet 86 will be out of registration with the upwardly extending pole piece portions 84. At this time the magnetic field across the pole faces 80 will be at a minimum, and even if the rotor 82 should rotate the extent of the electromagnetic interaction induced between the rotor 82 and the stator pole pieces 78 will also be at a minimum. However, the action of the cam 62 on the lever 64 will be such as to cause the magnet 86 to rotate between the upwardly extending pole piece portions 84 until the magnet poles are substantially in registration therewith. When this occurs the magnetic field across the pole faces 80 will be at a maximum. If the rotor 82 should be rotated eddy currents will be induced in the conductive portions thereof, these eddy currents will in turn inductively interact with the magnetic field across the pole faces 80, and rotation of the rotor 82 will be inhibited. The degree of such magnetic interaction will be dependent in part upon the speed at which the rotor 82 rotates, which will in turn be controlled by the speed at which the door is moving, but for any given speed of movement of the door and of the rotor 82, the magnetic interaction will also be dependent upon the magnitude of the magnetic field across the pole faces 80.

It will be understood that for any position of the permanent magnet 86 relative to the stator pole pieces 78 intermediate between the inoperative and operative positions thereof described above, the magnitude of the magnetic field within which the rotor 82 rotates will be intermediate between minimum and maximum amplitude, and consequently the position of the permanent magnet 86, in moving from its inoperative to its operative position in accordance with the instantaneous position of the door, will vary the magnitude of the magnetic field operative on the rotor 82 and hence will control the degree of checking or restraint exerted on the door.

Because of the action of the one-way clutch 76, the rotor 82 will not be rotated while the door is opening, and hence the brake 6 will offer no resistance to movement of the door from closed to open position, as driven by the motor 2, even though the magnitude of the magnetic field across the pole faces 80 may be quite high. Before the door has reached its open position the cam 62 will be rotated sufficiently to permit the lever 64 to move the permanent magnet 86 to inoperative position. Consequently, when the motor 2 is de-energized and the spring 4 takes over to close the door, the brake 6 initially will exert no appreciable restraining action on movement of the door even though the rotor 82 is rotated, since the magnetic field operative on the rotor 82 will be at a minimum. As the cam 62 continues to rotate, however, it will cause the lever 64 to pivot, the magnet 86 will be correspondingly moved toward its operative position, the magnitude of the magnetic field active on the rotor 82 will progressively increase, and consequently the checking of the restraining action exerted on the door during its closing movement by the brake 6 will increase for a given speed of movement of the door, reaching its maximum value as the door moves into closed position, thus providing for effective cushioning of the door as it closes.

Figure 3:
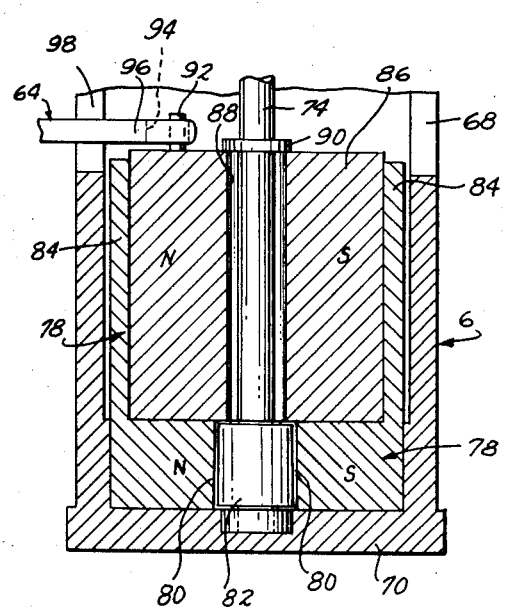
Fig. 3 is a vertical cross sectional view of the eddy current brake utilized in the unit of Fig. 1.
Figure 4:
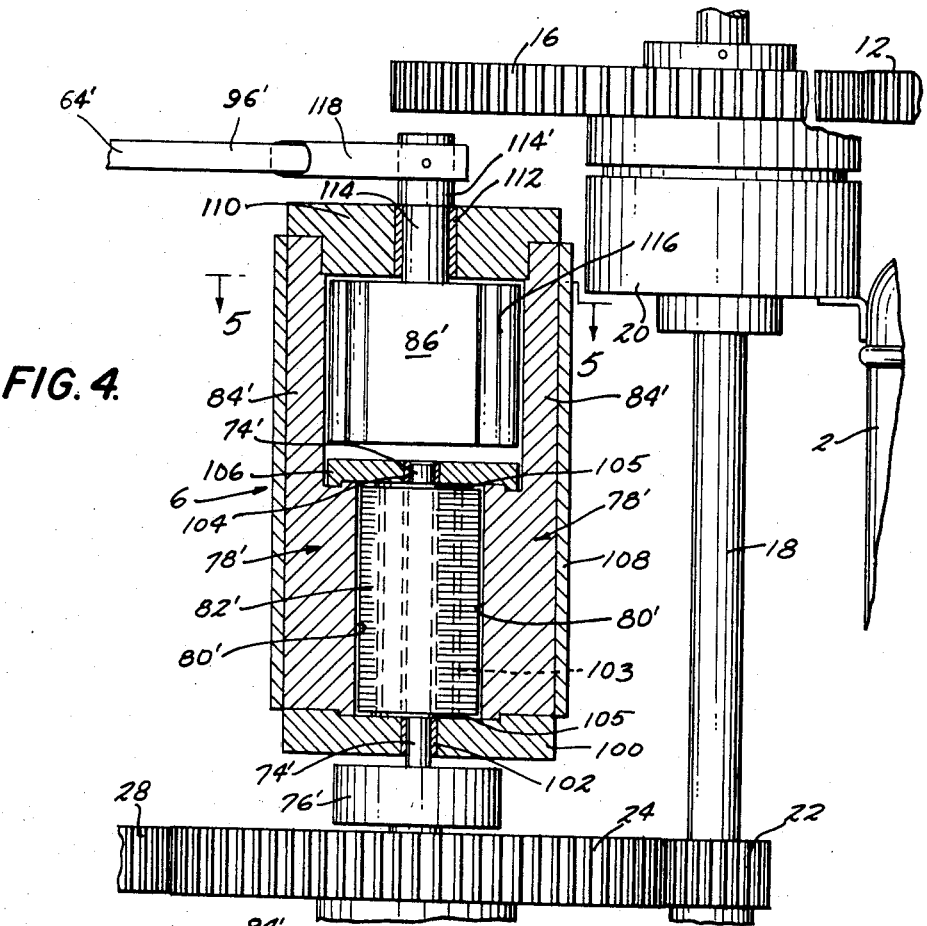
Fig. 4 is a cross sectional view of a second embodiment of an eddy current brake construction, shown utilized in a unit similar to that of Fig. 1.

Fig. 4 discloses an alternative embodiment for a brake 6 in which the apertures 68 and 98 in the brake casing 70 of the brake of Figs. 1–3 are eliminated, thus providing for the effective sealing of the moving parts and making the brake less susceptible to deterioration from foreign matter such as dirt, dust, moisture and the like. The pole pieces 78' of magnetizable material are provided with pole faces 80' and upwardly extending portions 84'. Secured to the bottom of the pole pieces 80', as by welding, is an end cap 100, preferably of non-magnetic material, within which bearing bushing 102 is received, the shaft 74' rotatably passing through the bushing 102 and carrying rotor 82', specifically shown as of the squirrel cage type, having axial conductors 103 connected by end rings 105. The upper end of the shaft 74' is rotatably received within bearing bushing 104 mounted on plate 106 secured as by welding to the upper surface of those portions of the pole pieces 78' extending radially inwardly to define the pole faces 80'. A shell 108 is secured to the outside of the pole pieces 78 in any appropriate manner, as by being a press fit or by welding.

A top plate 110 is secured to the upper surface of the upwardly extending pole piece portions 82' in any appropriate manner, as by welding. It is provided with bearing bushing 112 within which shaft 114 is rotatable, the upwardly extending portion 114' of the shaft 114 being shouldered so as to limit the degree to which the shaft 114 can move downwardly. Mounted on that portion of the shaft 114 which extends into the space between the upwardly extending pole piece portions 82 is the permanent magnet 86'. As may best be seen from Figs. 5 and 6, the permanent magnet 86' is provided with longitudinal grooves 116 between the magnetic poles thereof, those poles being equal in number to and of substantially the same circumferential extent as the upwardly extending portions 82' of the pole pieces 78'. Fast on the upwardly projecting portion 114' of the shaft 114 is an arm 118 which is operatively connected in any appropriate manner to an actuating device, such as the end 96' of the lever 64'.

Figure 5:
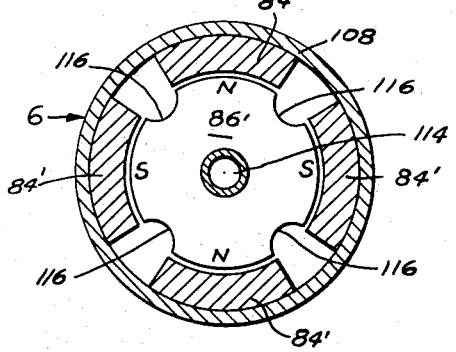
Fig. 5 is a cross sectional view taken along the line 5—5 of Fig. 4 and showing the permanent magnet in its operative position.
Figure 6:
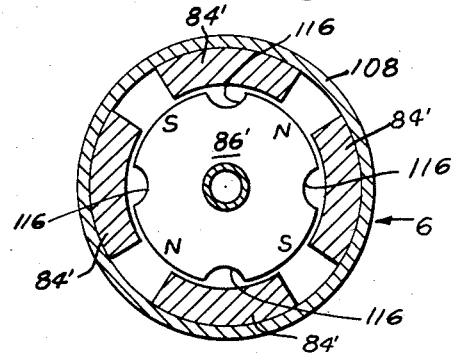
Fig. 6 is a view similar to Fig. 5 but showing the permanent magnet in its inoperative position.

Making reference now specifically to Figs. 5 and 6, Fig. 5 discloses the relative positions of the poles of the magnet 86' and the upwardly extending pole piece portions 82' when the magnet 86' is in its operative position. Each of the magnet poles is positioned opposite a given upwardly extending pole piece portion 82', and the grooves 116 between the magnet poles are in registration with the spaces between the upwardly extending pole piece portions 82'. Magnetic flux will then travel from a given magnet pole down through the corresponding pole piece 78' to the pole face 80' thereof, thence through the rotor 82' to the next adjacent pole piece 78', and then up through that latter pole piece to the next adjacent pole on the magnet 86'.

When the magnet 86' is in its inoperative position, as shown in Fig. 6, the grooves 116 between the magnet poles are positioned in registration with the respective upwardly extending pole piece portions 82'. Hence there will be opposite each pole piece portion 82' a part of a north pole and a part of an adjacent south pole of the magnet 86'. As a result magnetic flux will travel from one magnet pole to the next adjacent pole directly through the upwardly extending pole piece portion 82'. No appreciable amount of flux will pass down through the pole pieces 78' to the pole faces 80' thereof. Hence no appreciable magnetic field will pass through any portion of the rotor 82', and the pole piece portions 82' will act as "keepers" for the magnet 86'.

It will be appreciated that the disclosure of Figs. 5 and 6 is applicable as well to the brake 6 in the embodiment of Figs. 1–3, except that the inner portion of the magnet 86 differs from the corresponding portion of the magnet 86'.

In view of the fact that the brake 6 in the embodiment of Fig. 4 has the rotor shaft 74' extending from the lower end thereof, some slight modification of the arrangement of parts of the door operating unit is required. The motor 2, as before, drives the gear 12 through an overrunning clutch 14, that gear meshing with gear 16 adapted to be operatively connected to shaft 18 by means of electromagnetic clutch 20. The pinion 22 fast on the shaft 18 meshes, as before, with the gear 24, that gear in turn meshing with gear 28. The one-way clutch 76' operatively connects the gear 24 with the rotor shaft 74', that clutch 76' being positioned above the gear 24 and the brake 6 being positioned above the clutch 76'.

While but a limited number of embodiments of the present invention have been here disclosed, it will be apparent that many changes may be made in the construction thereof, particularly in the arrangement and design of the individual parts and in the mechanism employed to provide for an adjustable variation in the magnitude of the magnetic field within which the rotor rotates, all within the spirit of the present invention as defined in the following claims.

I claim:

1. An eddy current brake comprising a support, a magnetizable stator on said support including pole pieces having pole faces, a rotor mounted on said support for rotation about an axis between said pole faces and comprising conductive elements, magnetizing means mounted on said support for rotation substantially coaxially with said rotor and operatively associated with said pole faces to provide them with a magnetic field, movable control means operatively associated with said magnetizing means for rotating the latter relative to said pole pieces and thereby varying the intensity of said magnetic field at said pole faces, said control means being movable between an operative position in which the strength of said field at said pole faces is a maximum and an inoperative position in which the strength of said field at said pole faces is a minimum, means accessible from the exterior of said support and operatively connected to said control means to move the latter between its operative and inoperative positions, said pole pieces extending axially from said pole faces, said permanent magnet being received between said extending pole piece portions.

2. An eddy current brake comprising a support, a magnetizable stator on said support including pole pieces having pole faces, a rotor mounted on said support for rotation about an axis between said pole faces and comprising conductive elements, magnetizing means mounted on said support for rotation substantially coaxially with said rotor and operatively associated with said pole faces to provide them with a magnetic field, movable control means operatively associated with said magnetizing means for rotating the latter relative to said pole pieces and thereby varying the intensity of said magnetic field at said pole faces, said control means being movable between an operative position in which the strength of said field at said pole faces is a maximum and an inoperative position in which the strength of said field at said pole faces is a minimum, a shaft operatively connected to said rotor to rotate the latter and extending from one end of said support to a point beyond said support, and said control means comprising a shaft operatively connected to said magnetizing means and extending from the other end of said support, said shafts being substantially coaxial.

3. The eddy current brake of claim 2, in which said pole pieces extend axially from said pole faces, said magnetizing means being received between said extending pole piece portions.

4. An eddy current brake comprising a support, a magnetizable stator on said support including pole pieces having pole faces, said pole pieces extending from said pole faces and defining separated elements, a rotor mounted on said support for rotation about an axis between said pole faces and comprising conductive elements, a permanent magnet operatively associated with said pole pieces for supplying a magnetic field thereto and mounted within said support so as to be rotatable substantially coaxially with said rotor between an operative position in which the poles of said magnet are operatively in registration with said pole piece elements and an inoperative position in which the poles of said magnet straddle the spaces between said pole piece elements, means accessible from the exterior of said support and operatively connected to said rotor to rotate the latter, and control means accessible from the exterior of said support and operatively connected to said magnet to move the latter between its operative and inoperative positions, said pole piece elements extending axially from said pole faces, said permanent magnet being received between said elements.

5. An eddy current brake comprising a support, a magnetizable stator on said support including pole pieces having pole faces, said pole pieces extending from said pole faces and defining separated elements, a rotor mounted on said support for rotation about an axis between said pole faces and comprising conductive elements, a permanent magnet operatively associated with said pole pieces for supplying a magnetic field thereto and mounted within said support so as to be rotatable substantially coaxially with said rotor between an operative position in which the poles of said magnet are operatively in registration with said pole piece elements and an inoperative position in which the poles of said magnet straddle the spaces between said pole piece elements, a shaft operatively connected to said rotor to rotate the latter and extending from one end of said support to a point beyond said support, and said control means comprising a shaft operatively connected to said permanent magnet and extending from the other end of said support, said shafts being substantially coaxial.

6. The eddy current brake of claim 5, in which said pole piece elements extend axially from said pole faces, said permanent magnet being received between said elements.

7. An eddy current brake comprising a support, a magnetizable stator on said support including pole pieces having pole faces, a rotor mounted on said support for rotation about an axis between said pole faces and comprising conductive elements, magnetizing means mounted on said support for rotation substantially coaxially with said rotor and operatively associated with said pole faces to provide them with a magnetic field, movable control means operatively associated with said magnetizing means for rotating the latter relative to said pole pieces and thereby varying the intensity of said magnetic field at said pole faces, said control means being movable between an operative position in which the strength of said field at said pole faces is a maximum and an inoperative position in which the strength of said field at said pole faces is a minimum, a shaft operatively connected to said rotor to rotate the latter and extending from one end of said support, said magnetizing means being mounted at said one end of said support so as to extend axially from said pole faces toward said one end of said support and said shaft extending through said magnetizing means, and actuating means accessible from the exterior of said support and operatively connected to said control means to move the latter between its operative and inoperative positions.

8. The eddy current brake of claim 7, in which said pole pieces extend axially from said pole faces, said magnetizing means being received between said extending pole pieces portions.

9. An eddy current brake comprising a support, a magnetizable stator on said support including pole pieces having pole faces, a rotor mounted on said support for rotation about an axis between said pole faces and comprising conductive elements, a permanent magnet operatively associated with said pole pieces for supplying a magnetic field thereto and mounted within said support so as to be rotatable substantially coaxially with said rotor between an operative position in which the poles of said magnet are operatively in registration with said pole pieces and an inoperative position in which the poles of said magnet are operatively out of registration with said pole pieces, a shaft operatively connected to said rotor to rotate the latter and extending from one end of said support, said permanent magnet being mounted at said one end of said support so as to extend axially from said pole faces toward said one end of said support and said shaft extending through said permanent magnet, and actuating means accessible from the exterior of said support and operatively connected to said control means to move the latter between its operative and inoperative positions.

10. The eddy current brake of claim 9, in which said pole pieces extend axially from said pole faces, said permanent magnet being received between said extending pole piece portions.

References Cited in the file of this patent

UNITED STATES PATENTS

| | | |
|---|---|---|
| 1,005,293 | Parsons | Oct. 10, 1911 |
| 2,503,704 | Bessiere | Apr. 11, 1950 |
| 2,670,448 | Bell | Feb. 23, 1954 |
| 2,717,675 | Smith | Sept. 13, 1955 |

FOREIGN PATENTS

| | | |
|---|---|---|
| 503,625 | Belgium | June 15, 1951 |